United States Patent [19]

Kobayashi

[11] Patent Number: 5,201,072
[45] Date of Patent: Apr. 6, 1993

[54] TUNER FOR DIVERSITY RECEPTION HAVING A FIXED ANTENNA AND A RETRACTIVE ANTENNA

[75] Inventor: Hiroshi Kobayashi, Saitama, Japan

[73] Assignee: Pioneer Electronic Corporation, Tokyo, Japan

[21] Appl. No.: 631,504

[22] Filed: Dec. 21, 1990

[30] Foreign Application Priority Data

Apr. 5, 1990 [JP] Japan ................................. 2-89131

[51] Int. Cl.$^5$ .......................... H01Q 1/32; H04B 7/08
[52] U.S. Cl. ............................... 455/277.1; 343/713; 455/152.1; 455/289
[58] Field of Search ............ 455/133, 134, 140, 152.1, 455/272, 277.1, 277.2, 273, 278.1, 283, 289, 290, 142, 180.1; 343/713, 901, 903

[56] References Cited

U.S. PATENT DOCUMENTS

4,958,382 9/1990 Imanishi ..................... 455/277

Primary Examiner—Reinhard J. Eisenzopf
Assistant Examiner—Chi H. Pham
Attorney, Agent, or Firm—Sughrue, Mion, Zinn, Macpeak & Seas

[57] ABSTRACT

A radio tuner for diversity reception, wherein a fixed antenna and a retractive antenna are installed as a receiving antenna and whichever the antenna at the stronger electric field strength is selectively switched to receive a radio signal in response to the received electric field strength, and thereby the receiving antenna system is selected compulsively to be the fixed antenna at the time when the retractive antenna is being protracted or retracted by monitoring a driving state of the retractive antenna. Thus, the receiving antenna system is never changed to the retractive antenna in the diversity reception as long as the retractive antenna is moving for protraction or retraction and a noise accompanying the protraction or retraction of the retractive antenna is prevented from entering into the received radio signal.

7 Claims, 6 Drawing Sheets

TUNER FOR DIVERSITY RECEPTION HAVING A FIXED ANTENNA AND A RETRACTIVE ANTENNA

BACKGROUND OF THE INVENTION

The present invention relates to a tuner for diversity reception and, more particularly, to a tuner equipped with a receiving antenna system consisting of a fixed antenna and a retractive antenna for diversity reception wherein the antenna being placed in a stronger electric field is selected for receiving a radio signal in accordance with a variation of a received electric field strength.

In a motor vehicle radio receiver or the like, in order to eliminate a reception failure caused by shielding of an electromagnetic wave or a multipath of propagation in mobile reception, an antenna diversity reception has been performed by switching a plurality of antennas, which include a fixed antenna such as a rear window antenna and a retractive antenna such as a motor driven whip antenna, for receiving a radio signal with the antenna which is at a stronger electric field strength than the other. In such an antenna diversity reception system, the retractive antenna is normally retracted when the radio receiver is not in use and protracted to a predetermined length by motor driving when a power source of the radio receiver is turned on. Accordingly, when the power source of the radio receiver is turned off, the retractive antenna is retracted again by motor driving and enclosed in the original position.

In general, it is preferable to vary a length of the retractive antenna depending on a wave length of receiving radio signal for better reception. Consequently, an amount of protraction of the retractive antenna is controlled automatically in order to bring it to the most suitable antenna length such that not only at the time of ON/OFF operation of the power source but also at the time of changing FM/AM band and further, while receiving an FM broadcast, at the time of changing the reception from an FM station within a low frequency band (for example, within a range of 76-83 MHz) to an FM station within a high frequency band (for example, within a range of 84-90 MHz) or at the time of changing the reception from an FM station within the high frequency band to an FM station within the low frequency band.

However, if the retractive antenna is selected as a receiving antenna while it is being protracted or retracted, there has been a problem such that noise encountered in rubbing of the antenna elements during the movement thereof or noise generated by the antenna driven motor interferes with the reception of the radio signal by a radio receiver.

It is therefore an object of this invention to solve such a problem in the prior art and to provide a radio tuner for diversity reception free from noise due to the movement of antenna elements for protracting or retracting a length of a retractive antenna.

SUMMARY OF THE INVENTION

In order to attain the foregoing object, according to the present invention, in a radio tuner including an antenna system consisting of a fixed antenna and a retractive antenna, wherein the antenna which has the stronger electric field strength is selectively switched to receive a radio signal in response to the variation of the received electric field strength, the receiving antenna system in a radio tuner for diversity reception is switched over to the fixed antenna automatically at the time when the retractive antenna is being protracted or retracted by way of monitoring a driving state of the retractive antenna.

That is, while the retractive antenna is being driven so as to be protracted or retracted, the receiving antenna system is compulsively changed over to the fixed antenna and maintained thereat. Therefore, the receiving antenna system is never changed to the retractive antenna in the diversity reception as long as the retractive antenna is moving to protract or retract, thus noise accompanying the movement of antenna elements for protraction or retraction of the retractive antenna does not interfere with the radio signal reception.

BRIEF DESCRIPTION OF THE DRAWINGS

FIGS. 2a and 2b are flowcharts showing operational steps to be performed by the embodiment of the invention when a power source is turned on;

DESCRIPTION OF THE PREFERRED EMBODIMENTS

Preferred embodiments of this invention will now be described by referring to the accompanying drawings.

Figure 1:
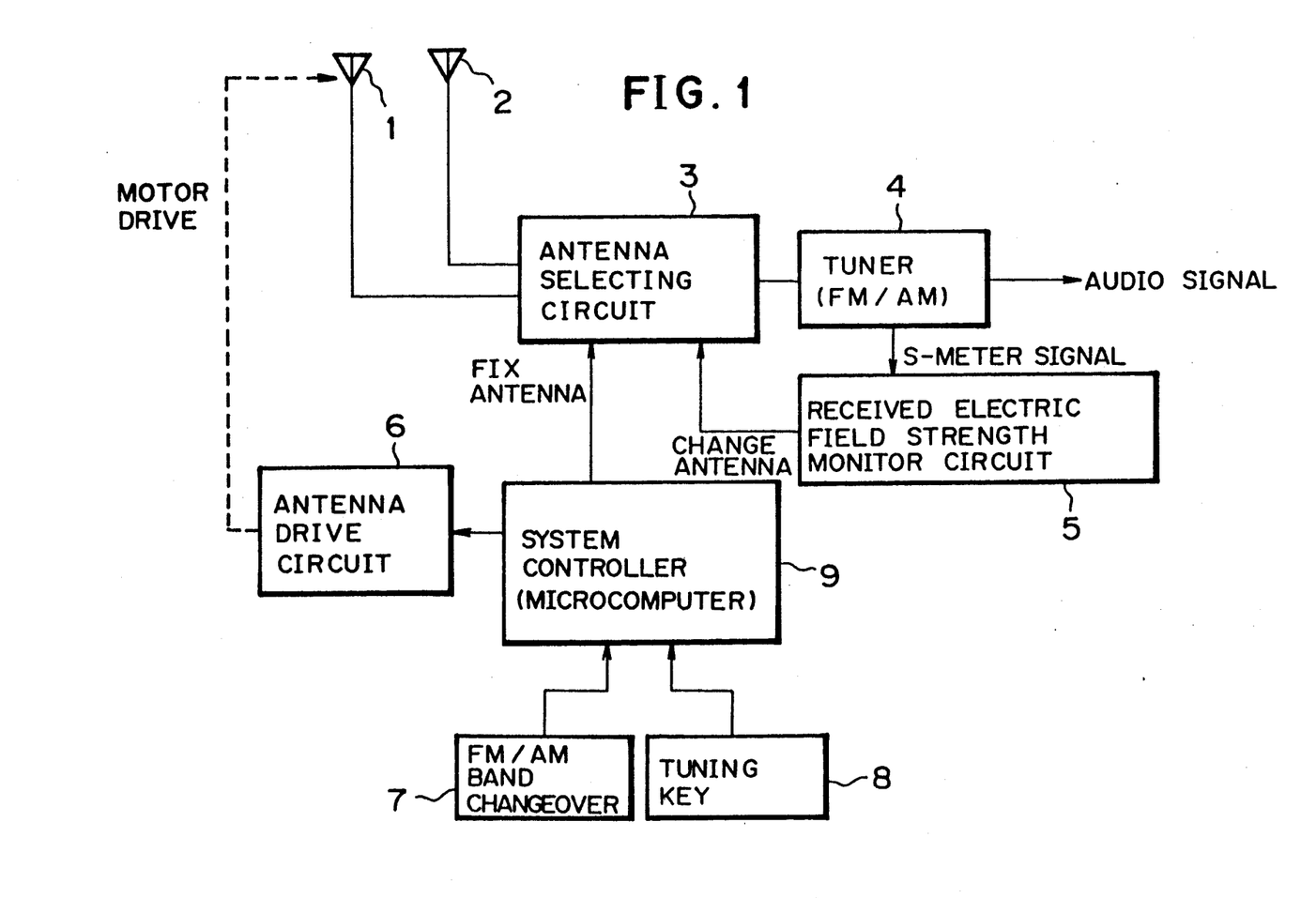
FIG. 1 is a block diagram showing an embodiment of the invention.

FIG. 1 is a block diagram showing an embodiment of this invention, i.e., a radio tuner for diversity reception to be mounted on a motor vehicle embodying the present invention. While the details are not shown, however, the tuner is generally combined with other sound sources, for example, a cassette tape player, a compact disk (CD) player or the like, for constituting a so-called "car audio system".

In FIG. 1, an element 1 denotes a retractive antenna, an element 2 denotes a fixed antenna, a block 3 denotes an antenna selecting circuit for diversity reception, a block 4 denotes an FM/AM tuner, a block 5 denotes a received electric field strength monitoring circuit for generating a command for selecting either the retractive antenna 1 or the fixed antenna 2 depending on a signal strength of a signal meter (S meter), a block 6 denotes an antenna driving circuit for controlling the protraction or retraction of the retractive antenna 1 by utilizing a motor, a block 7 denotes an FM/AM band changeover switch, a block 8 denotes a tuning key for selecting radio stations, and a block 9 denotes a system controller consisting of a microcomputer or the like.

As the retractive antenna 1, for example, the motor driven whip antenna as described above is used and incorporated protractively with a front fender of a motor vehicle at a prescribed portion and that the rear window antenna as above described is employed as the fixed antenna 2.

Figure 2A:
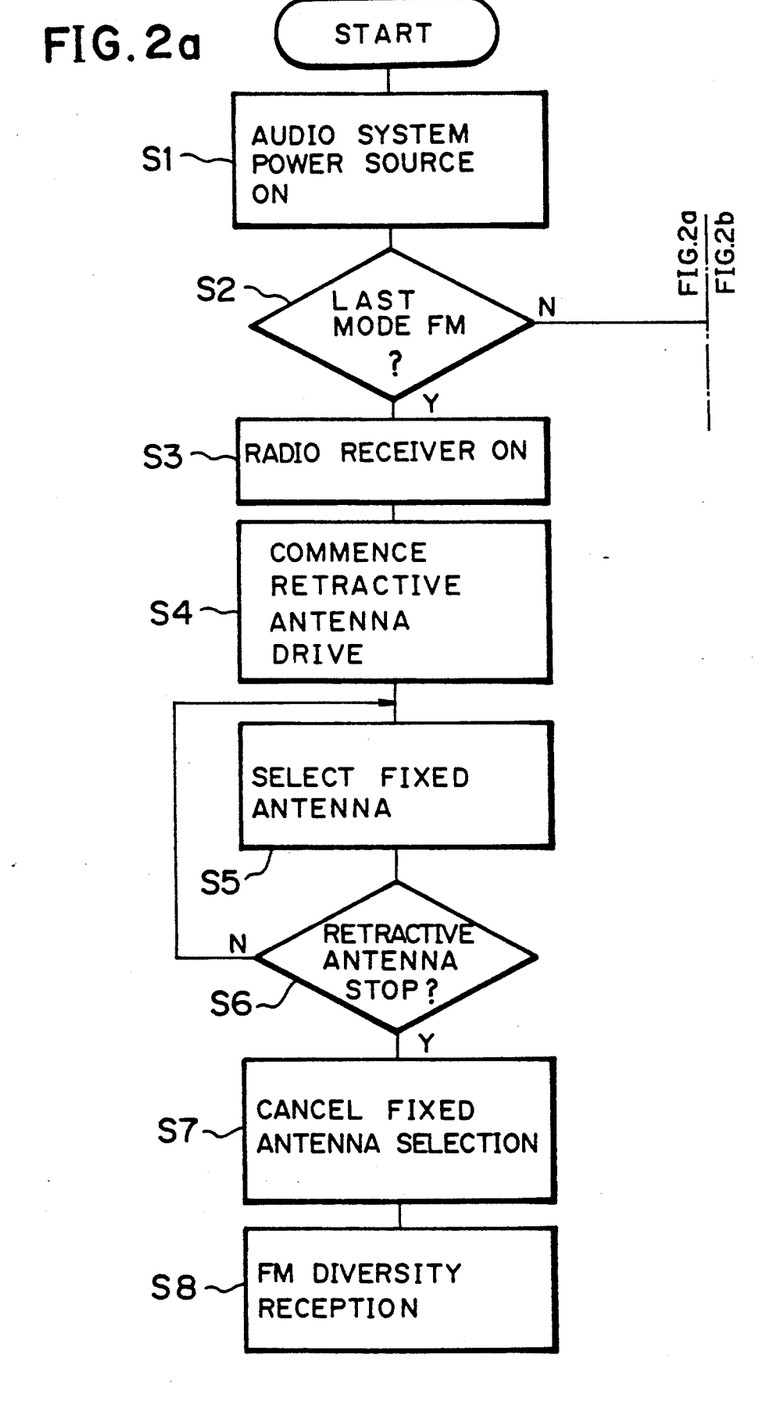
Figure 2B:
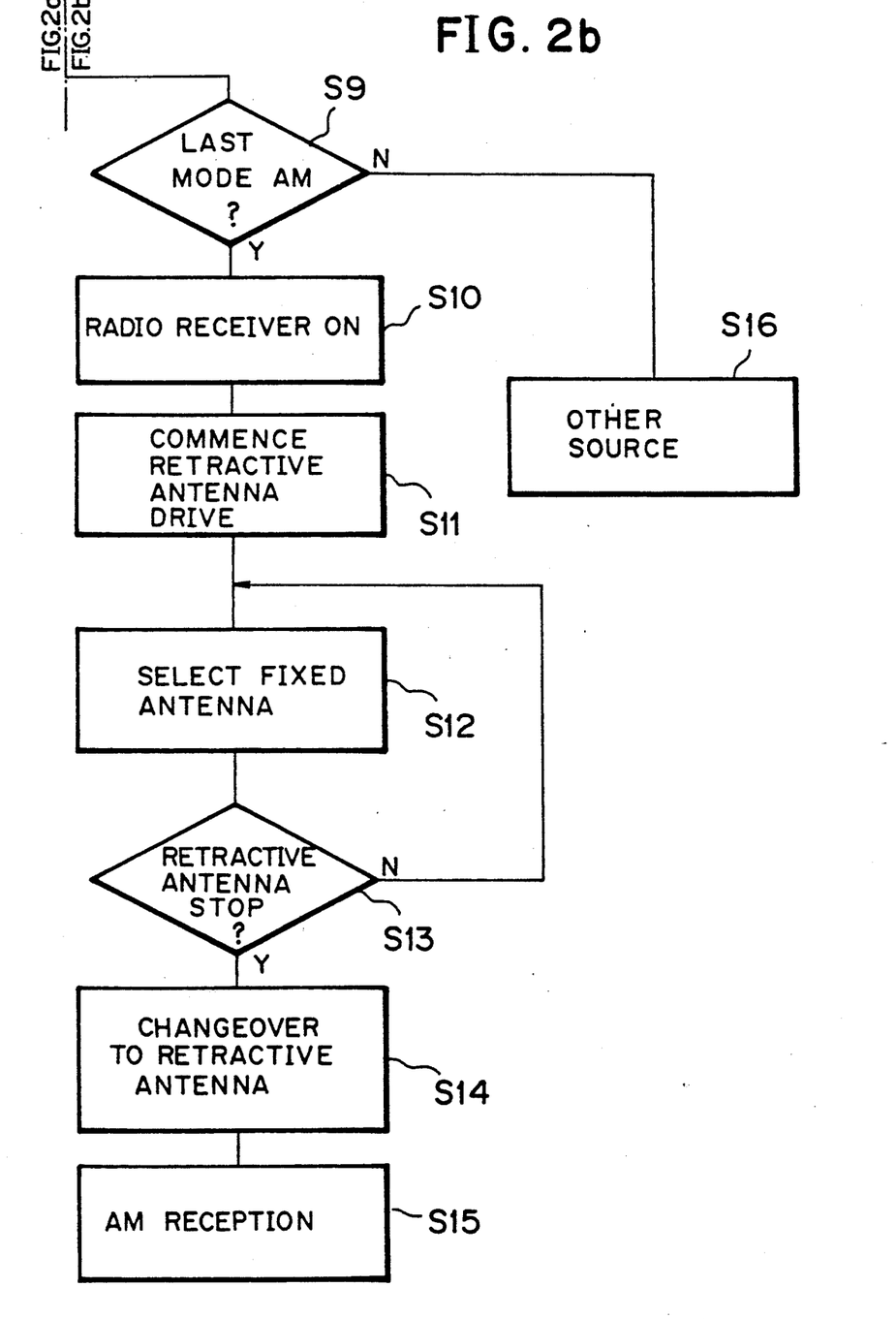
Figure 3A:
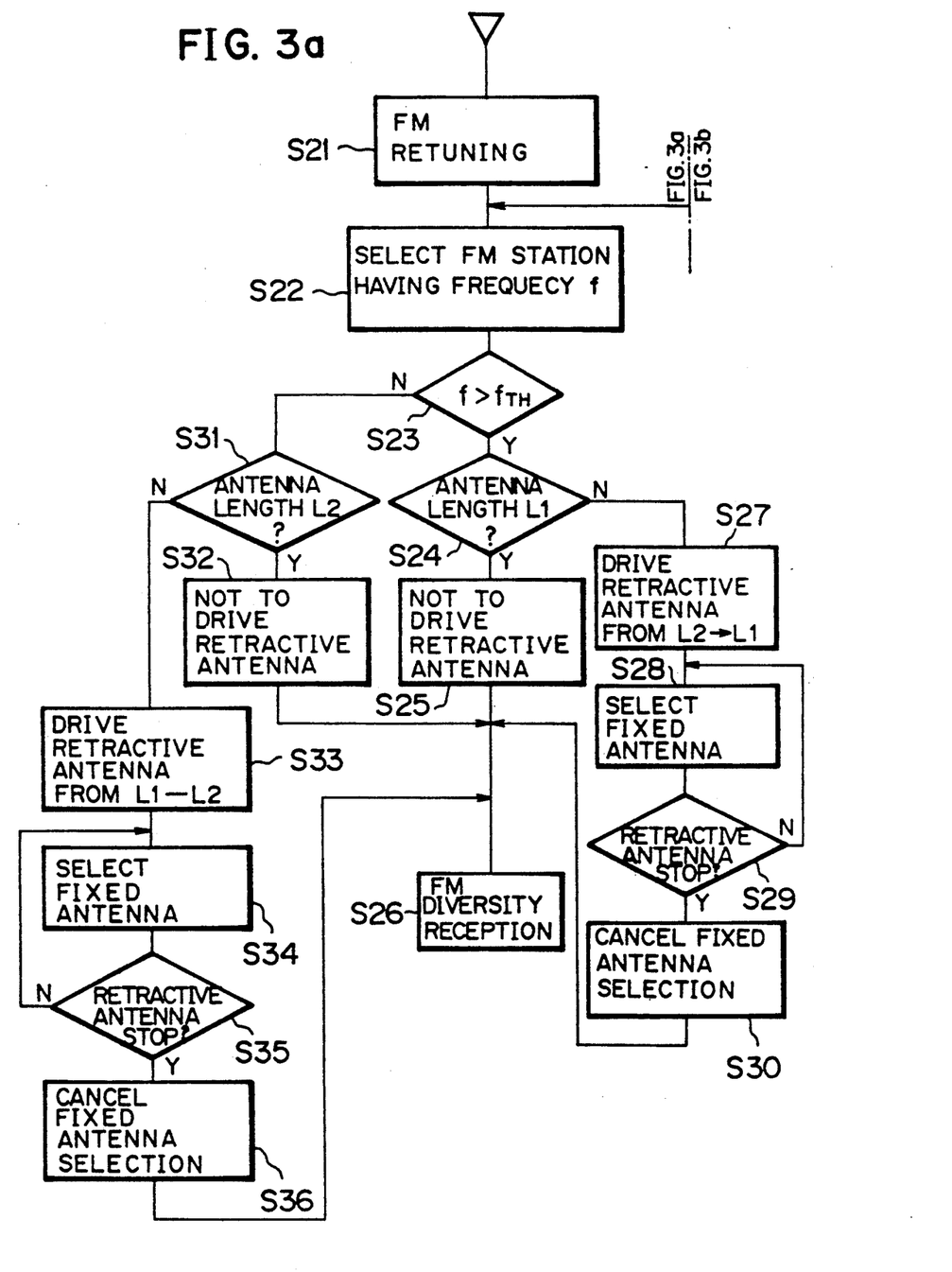
FIGS. 3a and 3b are flowcharts showing operational steps to be performed by the embodiment of the invention while in a listening mode.
Figure 3B:
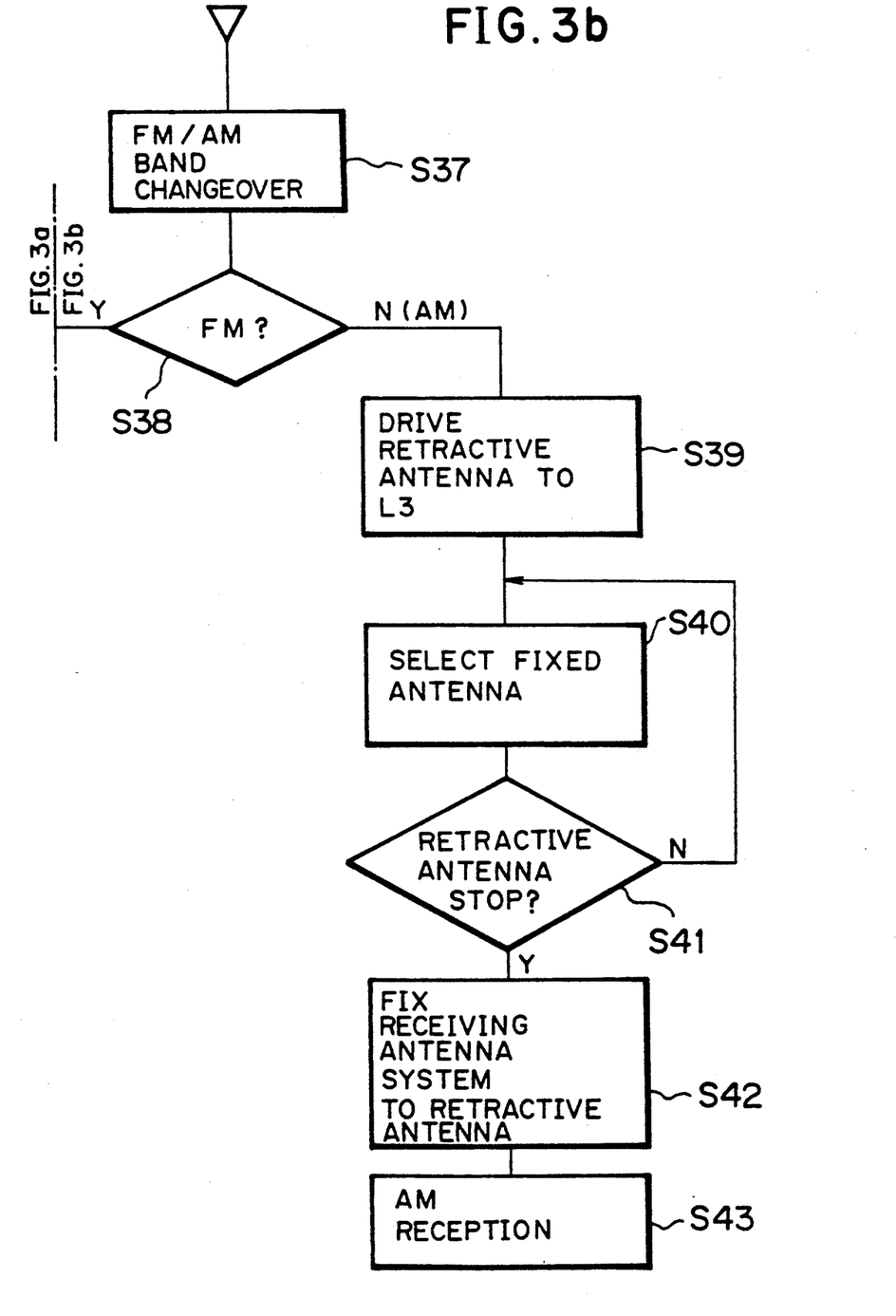

Now referring to flowcharts of FIGS. 2 and 3, operation of the embodiment of the invention will be described, whereby FIG. 2 is the flowchart showing operational steps to be performed by the audio system when a power source is turned on while FIG. 3 is the flowchart showing operational steps to be performed by the audio system while in listening.

First, the operational steps of the audio system when the power source is in an ON-state will be described by referring to FIG. 2.

If the power source of the audio system is turned on (step S1), the system controller 9 confirms the last sound source which has been listened to immediately before the ON-state of the power source, i.e., whether the last mode was FM, AM or source other than FM/AM source by accessing to a random access memory (RAM) contained in the system controller (steps S1 and S9).

If the last mode was, for example, the cassette tape player or the CD player or source other than the FM/AM source, the operational step goes to step S16, and then operational steps corresponding to other source (not shown) will be performed.

On the other hand, if the last mode was FM (step S2), the operational step goes to step S3 and the radio receiver is turned on by the system controller 9. Then, an antenna driving signal is transmitted to the antenna driving circuit 6 for driving the motor, and thereby driving the retractive antenna 1 to move from a retracted position to a protracted position (step S4). At the same time, a signal for compulsively selecting the fixed antenna 2 is transmitted to the antenna selecting circuit 3 from the system controller 9, and the fixed antenna 2 is selected compulsively as a receiving antenna system for use (step S5). That is, as long as the retractive antenna 1 is in a state of movement, the receiving antenna system is changed compulsively to the fixed antenna 2, thus noise accompanying the movement of the retractive antenna 1 is prevented from entering the tuner 4.

If the retractive antenna 1 is protracted to the prescribed position and stops its movement (step S6), the compulsive selecting signal being fed to the antenna selective circuit 3 is canceled (step 7) and the antenna selecting circuit 3 is returned to a normal diversity reception mode (step S8), and thereby either of the antennas at the stronger electric field strength in reception, which is indicated by the electric field strength monitoring circuit 5, is selected for commencing the FM reception in accordance with the antenna diversity reception.

Further, if the last mode was AM (step S9), the operational step goes to step S10, and similarly to the FM reception, the receving antenna system is changed compulsively to the fixed antenna 2 (steps S11, S12 and S13), and noise accompanying the protracting operation of the retractive antenna 1 is prevented from entering the tuner 4. In the case of AM, since a wave length of the received radio signal is long, there is hardly any improvement in reception even if the diversity reception is performed. Consequently, in the case of AM reception, after the retractive antenna 1 is protracted to a prescribed length which is suitable for the AM reception and stopped thereat (step S13), the receiving antenna system is changed to the retractive antenna 1 and fixed antenna (step S14), and then the AM reception is performed only by utilizing the retractive antenna 1 (step S15).

Next, the operational steps taken while listening to a radio broadcast will be described by referring to FIG. 3.

Figure 4:
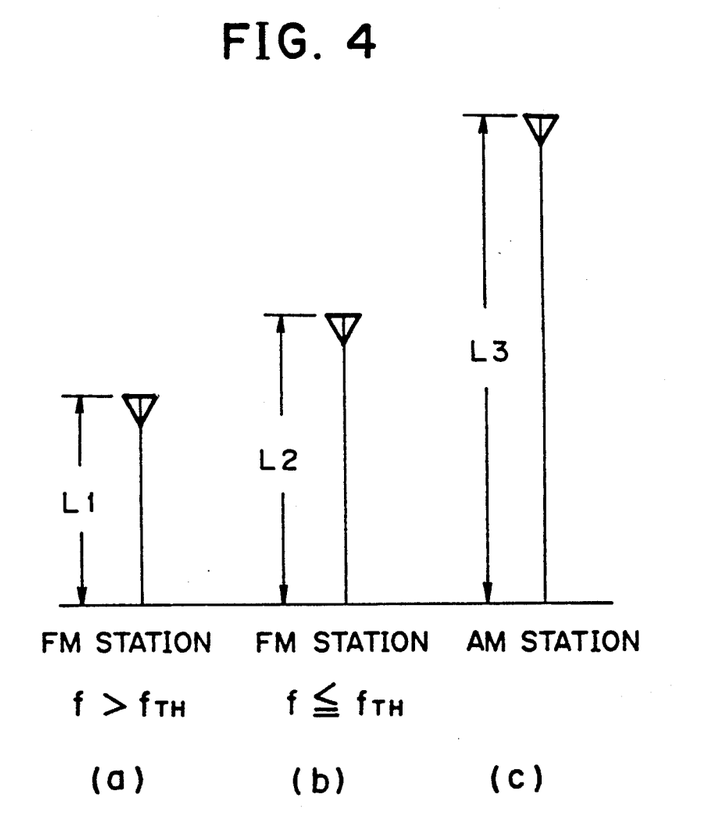
FIG. 4 is a diagram showing a state of varying a length of a retractive antenna in the embodiment of the invention.

Referring to the flowchart of FIG. 3, the retractive antenna 1 is controlled so as to be an antenna length of L1 in the case of FM signal reception, as shown in FIG. 4(a), when a receiving frequency f is higher than a predetermined threshold frequency $f_{TH}$ which is located approximately at the center of the FM broadcasting band (76-90 MHz in Japan), and to be an antenna length of L2 as shown in FIG. 4(b) when the receiving frequency f is lower than the threshold frequency $f_{TH}$. Further, in the case of AM signal reception, the retractive antenna 1 is controlled so as to be an antenna length of L3 as shown in FIG. 4(c).

Although it has not been described with reference to FIG. 2 for simplifying the description, the stop position of the retractive antenna 1 in step S6 or S13 in FIG. 2 is actually controlled protractively or retractively to any of the antenna lengths shown in FIGS. 4(a), 4(b) and 4(c), in a manner similar to the description hereinafter described, depending on whether the last mode of reception was FM or AM and further, in case of FM signal reception mode, whether the last frequency of the FM station was higher or lower than the threshold frequency $f_{TH}$.

If the tuning key 8 is operated in the midst of FM signal reception and a new FM station is selected (steps S21 and S22), or if the FM/AM band changeover switch 7 is operated for changing the reception band from AM to FM and a new FM station is selected (steps S37, S38 and S22), the system controller 9 firstly makes a decision whether or not a new receiving frequency f of the newly selected FM station is higher than the predetermined threshold frequency $f_{TH}$ or $f > f_{TH}$ (step S23).

If $f > f_{TH}$, that is, if the receiving frequency of the new FM station is within a frequency range higher than the threshold frequency $f_{TH}$, the system controller 9 secondly makes a decision whether or not the present antenna length of the retractive antenna 1 is at the short antenna length of L1 shown in FIG. 4(a) and is suited for receiving a signal on the receiving frequency f of the new FM station (step S24). If the antenna length has been set to the length of L1, since there is no need of retracting antenna elements of the retractive antenna 1 (step S25), the diversity reception will be started without any delay on the receiving frequency of the new FM station (step S26).

On the other hand, if it is decided at step S24 that the antenna length of the retractive antenna 1 is other than L1, the system controller 9 outputs an antenna driving signal to the antenna driving circuit 6 for driving the retractive antenna to the length of L1 (step S27) and, for example, the antenna length of the retractive antenna 1 is retracted from the length of L2 in FIG. 4(b) to the length of L1 in FIG. 4(a). At the same time, a selecting signal for compulsively selecting the fixed antenna 2 is transmitted from the system controller 9 to the antenna selective circuit 3, and thereby the fixed antenna 2 is selected compulsively as a receiving antenna for use (step S28). Consequently, the receiving antenna system is changed compulsively to the fixed antenna 2 as long as the retractive antenna 1 is moving, and noise accompanying the movement of the antenna elements of the retractive antenna 1 is prevented from entering the tuner 4.

When the retractive antenna 1 is retracted from the antenna length of L2 to L1 and stopped (step S29), the selecting signal for compulsively selecting the fixed antenna 2 is canceled (step S30), and the diversity reception is started on the new receiving frequency of the new FM station (step S30).

Further, at step S23, if $f \leq f_{TH}$, that is, if the receiving frequency f of the new FM station is within a frequency range lower than the threshold frequency $f_{TH}$, the system controller 9 makes a decision whether or not the retractive antenna 1 has the long antenna length of L2 in FIG. 4(b) and is suitable for receiving a signal on the receiving frequency f of the new FM station (step S31). If the antenna length has been set to the length of L2, since there is no need of protracting the antenna elements of the retractive antenna 1 (step S32), the diversity reception will be started without any delay on the receiving frequency of the new FM station (step S26).

On the other hand, if it is decided at step S31 that the retractive antenna 1 does not have the antenna length of L2, the system controller 9 outputs an antenna deriving signal to the antenna driving circuit 6 for driving the retractive antenna to the length of L2 in FIG. 4(b) (step S33) and, for example, the antenna length of the retractive antenna 1 is protracted from L1 to L2. At the same time, the selecting signal for compulsively selecting the fixed antenna 2 as the receiving antenna system is transmitted to the antenna selecting circuit 3, and thereby the fixed antenna 2 is selected compulsively as the receiving antenna system for use (step S34). Accordingly, the receiving antenna system is changed compulsively to the fixed antenna 2 as long as the retractive antenna 1 is moving, and noise accompanying the movement of the antenna elements of the retractive antenna 1 is prevented from entering the tuner 4.

When the retractive antenna 1 is protracted from the antenna length of L1 to L2 and stopped (step S35), the selecting signal for compulsively selecting the fixed antenna 2 is canceled (step S36), and the diversity reception is started with no delay on the receiving frequency of the new FM station (step S26).

Further, if the reception band is changed from FM to AM at steps S37 and S38, the system controller 9 outputs an antenna driving signal to the antenna driving circuit 6 for driving the retractive antenna 1 to the length of L3 in FIG. 4(c) (step S39), and thereby the retractive antenna 1 is protracted to the maximum length of L3 which is suitable for the AM reception. At the same time, the selecting signal for compulsively selecting the fixed antenna 2 as the receiving antenna system is transmitted to the antenna selecting circuit 3, and thereby the fixed antenna 2 is selected compulsively as the receiving antenna system for use (step S40). Consequently, the receiving antenna system is changed compulsively to the fixed antenna 2 as long as the retractive antenna 1 is moving, and noise accompanying the movement of the antenna elements of the retractive antenna 1 is prevented from entering the tuner 4.

When the retractive antenna 1 is protracted to the maximum length of L3 and stopped (step S41), the system controller 9 outputs a command signal to the antenna selecting circuit 3 for changing the receiving antenna system from the fixed antenna 2 to the retractive antenna 1 (step S42), and then the AM reception is performed with only use of the retractive antenna 1 (step S43).

It will be clearly understood from the foregoing description, according to the present invention, since the receiving antenna system is changed compulsively to the fixed antenna as long as the retractive antenna is in a state of protractive or retractive movement, noise caused by the rubbing of the antenna elements when they are moved or noise generated by the antenna driving motor is prevented from entering the tuner. Thus, noise during the radio listening can be reduced considerably in comparison with the conventional tuner for diversity reception.

The present invention is not to be considered to be limited to the specific embodiments illustrated, except insofar as may be required by the following claims.

What is claimed is:

1. In a tuner for diversity reception including a receiving antenna system comprising a fixed antenna and a retractive antenna to be protracted or retracted, wherein one of said fixed antenna and said retractive antenna which has a strongest received electric field strength is selected as the receiving antenna for use in response to the received electric field strength, the tuner for diversity reception comprising:
   means for monitoring a driving state of said retractive antenna; and
   selecting means coupled to said monitoring means and responsive to an output thereof for automatically selecting the fixed antenna as the receiving antenna to be used, when the retractive antenna is being moved to vary a length thereof.

2. A tuner for diversity reception according to claim 1, further comprising an antenna driving mechanism for driving said retractive antenna, wherein, upon actuation of said antenna driving mechanism, said selecting means automatically selects said fixed antenna.

3. In a tuner for diversity reception including a receiving antenna system comprising a fixed antenna and a retractive antenna to be protracted or retracted, wherein either said fixed antenna or said retractive antenna, in accordance with whichever has the received electric field strength stronger than the other, is selected as the receiving antenna for use in response to the received electric field strength, the tuner for diversity reception comprising:
   means for monitoring a driving state of said retractive antenna;
   selecting means coupled to said monitoring means for automatically selecting the fixed antenna, based on an output of said monitoring means, as the receiving antenna system to be used, while the retractive antenna is being moved to vary a length thereof; and
   a system controller comprising means for detecting at least one of a mode of reception and a frequency of reception, and means for outputting a selecting signal to the selecting means for compulsively selecting the fixed antenna based on said at least one of said mode of reception and said frequency of reception.

4. A tuner for diversity reception according to claim 3, further including an FM/AM band changeover switch, coupled to said system controller, for changing a mode of reception of said tuner and outputting a signal to said system controller to change said mode of reception of said tuner.

5. A tuner for diversity reception according to claim 4, wherein the system controller includes means for deciding whether the retractive antenna is required to vary the length thereof for receiving a radio signal on the selected mode of reception.

6. A tuner for diversity reception according to claim 5, wherein said system controller includes a random access memory, and wherein a direction of the movement for varying the length of the retractive antenna is controlled depending on the last mode of reception and the last receiving frequency which are stored in said random access memory of said system controller.

7. In a tuner for diversity reception including a receiving antenna system comprising a fixed antenna and a retractive antenna to be protracted or retracted, wherein either said fixed antenna or said retractive antenna, in accordance with whichever has the received electric field strength stronger than the other, is selected as the receiving antenna for use in response to the received electric field strength, the tuner for diversity reception comprising:

means for monitoring a driving state of said retractive antenna; and selecting means coupled to said monitoring means for automatically selecting the fixed antenna, based on an output of said monitoring means, as the receiving antenna system to be used, while the retractive antenna is being moved to vary a length thereof, wherein the fixed antenna comprises a rear window antenna and the retractive antenna comprises a motor driven whip antenna.

* * * * *